(No Model.)
J. B. ALLFREE.
ROLLER GRINDING MILL.
No. 280,992. Patented July 10, 1883.
Fig. 1.
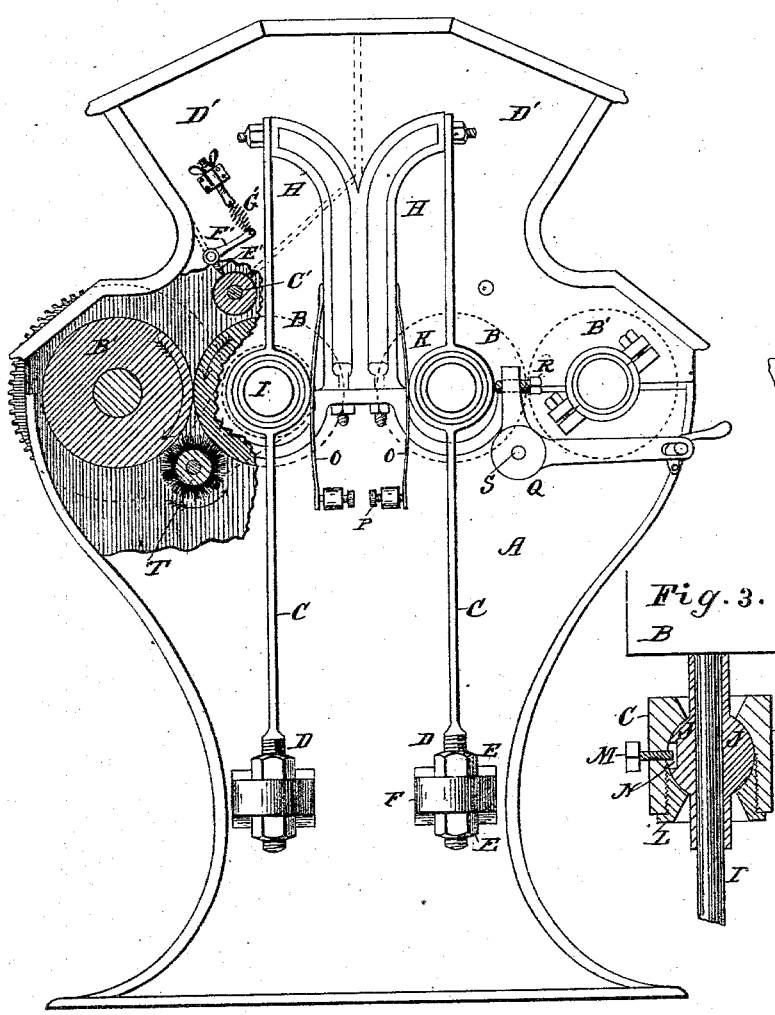
Fig. 2.
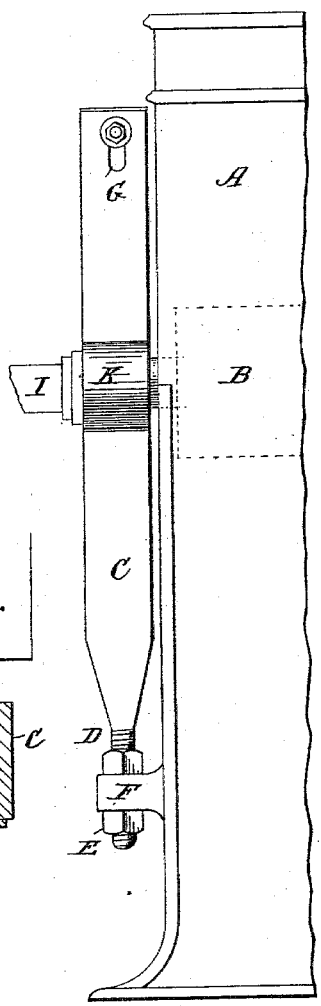
Fig. 3.
WITNESSES:
Thos Houghton
A. G. Syne
INVENTOR:
J. B. Allfree
BY Munn & Co
ATTORNEYS.

UNITED STATES PATENT OFFICE.

JAMES B. ALLFREE, OF CUMBERLAND, MARYLAND.

ROLLER GRINDING-MILL.

SPECIFICATION forming part of Letters Patent No. 280,992, dated July 10, 1883.

Application filed April 19, 1883. (No model.)

*To all whom it may concern:*

Be it known that I, JAMES B. ALLFREE, of Cumberland, in the county of Alleghany and State of Maryland, have invented a new and useful Improvement in Roller Grinding-Mills, of which the following is a full, clear, and exact description, reference being had to the annexed drawings, forming part of this specification.

My invention relates to that class of mills in which grain and other substances are crushed and ground by being fed between rollers; and the object of my invention is to provide an improved means for adjusting the movable rollers and adapting them to regain their original adjustment automatically after being temporarily displaced or sprung out of proper relation to the stationary rollers by the passage of unyielding foreign bodies that may happen to be in the grain.

The invention consists of the novel construction hereinafter described and claimed.

In the drawings, Figure 1 is a side elevation of a roller grinding-mill, partly broken away, showing my invention; and Figs. 2 and 3 are detail views, showing the spring-bar supports for the movable rollers.

The roller-mill A is provided with two pairs of grinding or crushing rollers, of which one in each pair is made adjustable and the other stationary. The adjustable rollers B are supported at each end in spring-bars C, which are adapted for longitudinal adjustment by means of screw-bolts D, formed at the lower ends thereof, and nuts E, screwing on the bolts on opposite sides of the supporting-brackets F, and slots G, formed in the upper ends of the bars, by which they are bolted to the supports H. The shafts I of the rollers B are provided with bearings J, which form ball-and-socket joints with the spring-bars C, the latter being constructed with hollow cylindrical parts K, for receiving the bearings J. The bearings are secured in the parts K of the bars by means of annular nuts L, screwing into said parts, and to prevent the bearings from rotating with the shafts I a set-screw, M, may be inserted through one side of each part K, and adapted to take into a recess, N, formed in the surface of the bearing. The recess is to be sufficiently large to allow free movement to the ball-and-socket joint when such movement is necessary.

The spring-bars C, which are provided with bearings at or near their centers for the rollers B, are made straight, and are put under tension only when the rollers B are adjusted to or from the stationary rollers B'. For adjusting the rollers B toward the rollers B', a spring, O, is secured to the support H, and is adapted to bear against the part K of the bar C. This spring has a free end, which is adapted to be adjusted by a set-screw, P, to regulate its action upon the bar C and the roller B. The adjustment of the roller B toward the roller B' is to be limited, according to the desired effect to be produced, by an elbow, Q, having a screw or projection, R, in one end, adapted to bear against the part K on the side opposite to the spring O, and having means—such as an eccentrically-movable pin engaging therewith, as shown—for adjusting the opposite end to oscillate the elbow on its pivot S, and regulate the action of the stop R upon the roller B. The two elbows Q, which are required for each roller B, may be connected together by a rod at their outer ends, if desired, and provided with a single adjusting device for operating both simultaneously. With the above-described construction the movable rollers may be adjusted either vertically or horizontally, and when once properly adjusted they will always regain their required adjustment automatically when thrown out of it by the passage of unyielding bodies.

In order to disintegrate bunches of ground substance that are formed by the meal adhering to the rollers when the latter are heated, and which are commonly disintegrated by means of a separate device specially provided for that purpose, a brush-roll, T, may be located under the rollers B B', and given a peripheral speed equal to that of the fast roller B. As the speed of the roller B' is to be comparatively slow, the action of the brush T upon its surface will not only remove the bunched mass from the said roller, but will disintegrate it at the same time. It is understood that the brush-roll is to rotate in the same direction as the slow roller; but its more rapid speed will secure the desired action upon the bunched substance, while the fact that the brush and fast roller rotate in opposite directions will secure the same effect upon any substance that may adhere to the fast roller.

C' indicates the feed-roll, arranged in the hopper D' in the usual manner. The gage E' is supported on pivots, and is provided with an arm, F', having a retaining-spring, G', for supporting the gage against the weight of the grain in the hopper. Under a proper supply of grain, the gage will be opened sufficiently to give a uniform feed to the grinding-rollers.

Having thus described my invention, what I claim as new is—

1. The combination, with the adjustable or movable roller of a roller grinding-mill, of the spring-bars adapted to support the said roller near or at their centers, and devices for adjusting the roller to or from the unadjustable or stationary roller by putting a tension upon said bars, substantially as shown and described.

2. The combination of the adjustable or movable roller, the supporting spring-bars, the supplemental springs for adjusting the said bars toward the unadjustable or stationary roller, and an adjustable stop to limit the adjustment of the bars toward the latter roller, substantially as shown and described.

3. The combination of the adjustable or movable roller, the vertically-adjustable spring-bars supporting the same, and the bearings of the roller, forming ball-and-socket joints with the said bars, and annular nuts screwing into said bars, substantially as shown and described.

JAMES B. ALLFREE.

Witnesses:
 A. G. LYNE,
 SOLON C. KEMON.